United States Patent Office 3,702,851
Patented Nov. 14, 1972

3,702,851
3 - THIA - 1 - CYCLOHEXENE AND 3,6-DITHIA-1-CYCLOHEXENE-1,2 DICARBOXIMIDE METHYL ESTERS OF PYRETHRIC CHRYSANTHEMIC AND RELATED ACIDS
Toshio Mizutani, Hirakata-shi, Nobushige Itaya, Minoo-shi, Shigeyoshi Kitamura, Toyonaka-shi, Keimei Fujimoto, Kobe, and Yositosi Okuno, Toyonaka-shi, Japan, assignors to Sumitomo Chemical Company, Ltd., Osaka, Japan
No Drawing. Filed Jan. 26, 1970, Ser. No. 5,975
Claims priority, application Japan, Feb. 1, 1969, 44/7,453; Feb. 26, 1969, 44/14,946
Int. Cl. C07d 27/10
U.S. Cl. 260—326.3                                  10 Claims

ABSTRACT OF THE DISCLOSURE

A novel cyclopropanecarboxylic acid ester having the formula,

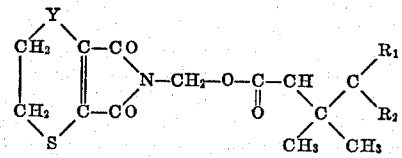

wherein $R_1$ is hydrogen atom or methyl, $R_2$ is methyl, 2-methyl-1-propenyl or 2-methoxycarbonyl-1-propenyl when $R_1$ is hydrogen atom, and $R_2$ is methyl when $R_1$ is methyl, and Y is methylene or sulfur atom; which ester is useful for an insecticide and is prepared by the esterification of the cyclopropanecarboxylic acid or reactive derivatives thereof with the hydroxy- or halo-methylimide.

This invention relates to a process for preparing novel esters represented by the formula,

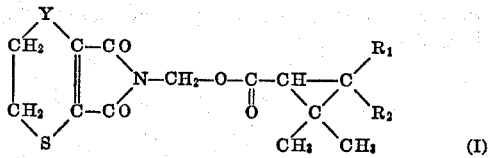

wherein $R_1$ is hydrogen atom or methyl, $R_2$ is methyl, 2-methyl-1-propenyl or 2-methoxycarbonyl-1-propenyl when $R_1$ is a hydrogen atom, and $R_2$ is methyl when $R_1$ is methyl, and Y is methylene or sulfur atom, and to insecticidal compositions containing said novel esters as active ingredients.

PRIOR ART

Among the insecticides used at present time, nothing can compare with pyrethrum extracts including pyrethrin or synthetic allethrin which is a homologue thereof, in the fact that it can be used without anxiety due to its harmlessnes to mammals and cattle in spite of its immediate effect. However, the pyrethrin extract and homologue thereof are relatively expensive, and are rather limited in the use despite their excellent usefulness.

After studying to obtain new effective esters the inventors have found a new type ester which is remarkably excellent in insecticidal activity as compared with the above pyrethrin and its homologue and is prepared at low cost. Thus, the present invention is achieved.

OBJECT

An object of the present invention is to provide a new cheap cyclopropanecarboxylic acid ester having more excellent insecticidal activity.

CHEMICAL COMPOUNDS

According to the present invention, a novel cyclopropanecarboxylic acid ester represented by the above-mentioned Formula I is provided.

It will be appreciated that the novel ester of Formula I includes naturally optically active isomers which occur due to the asymmetric carbon atom possibly present in the cyclopropanecarboxylic acid moiety such as α-trans-crysanthemummonocarboxylic residue.

Among the esters represented by the Formula I, the especially useful ones that are limitative in the present invention, are enumerated as follows:

| Compound number | Structure |
|---|---|
| 1 | ![structure 1] N-chrysanthemoxymethyl-3-thia-1-cyclohexene-1,2-dicarboximide, $n_D^{27.5}$: 1.5450. |
| 2 | ![structure 2] N-chrysanthemoxymethyl-3,6-dithia-1-cyclohexene-1,2-dicarboximide, M.P. 115°–117° C. |
| 3 | ![structure 3] N-(2′,2′,3′,3′-tetramethyl-cyclopropane-1′-carboxymethyl)-3-thia-1-cyclohexene-1,2-dicarboximide, $n_D^{25}$: 1.5471. |

| Compound number | Structure |
|---|---|
| 4 | 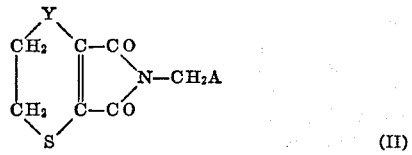<br>N-(2',2',3'-trimethylcyclopropane-1'-carboxymethyl)-3-thia-1-cyclohexene-1,2-dicarboximide, $n_D^{26}$: 1.5377. |
| 5 | 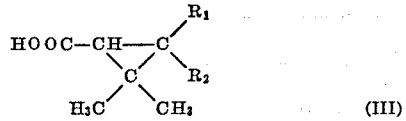<br>N-pyrethroxymethyl-3-thia-1-cyclohexene-1,2-dicarboximide, $n_D^{26}$: 1.5597. |

USE OF THE COMPOUND

The cyclopropanecarboxylic acid ester of Formula I has an excellent activity for killing insects such as houseflies, mosquitoes, cockroaches and the like, and can be used as insecticidal compositions not only in a wide scope for the prevention of epidemics but also controlling insects injurious to stored cereals, agriculture, especially crops before harvest, household horticulture, greenhouse cultivation and food-packaging, without anxiety due to its low toxicity.

PROCESS FOR PRODUCTION OF COMPOUND

The cyclopropanecarboxylic acid ester of Formula I is prepared for the first time by the present inventors, and is obtained easily and in good yield, for example, by the method comprising reacting an N-hydroxy- or halomethylimide of the formula,

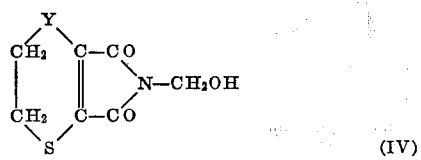

(II)

wherein Y is same as defined above, and A is a halogen atom or hydroxy group, with a cyclopropanecarboxylic acid of the formula,

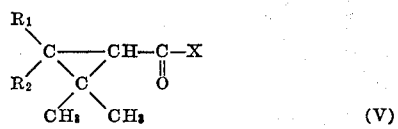

(III)

wherein $R_1$ and $R_2$ are same as defined above, or its reactive derivatives, in the presence of a suitable reaction-auxiliary agent, if necessary.

The first embodiment of the present invention lies in a process for preparing the esters represented by the Formula I by reacting, in the presence of a dihydrogen halide removing agent, an N-hydroxymethylimide represented by the formula, $$\begin{array}{c} Y \\ CH_2 \diagdown C-CO \\ | \quad \| \quad \diagdown N-CH_2OH \\ CH_2 \quad C-CO \\ \diagdown S \diagup \end{array}$$

(IV)

wherein Y is as defined above, with a cyclopropanecarboxylic acid halide represented by the formula, $$\begin{array}{c} R_1 \\ \diagdown C \text{——} CH-C-X \\ R_2 \diagup \diagdown C \diagup \quad \| \\ \diagup \diagdown \quad O \\ CH_3 \quad CH_3 \end{array}$$

(V)

wherein $R_1$ and $R_2$ are as defined above, and X is a halogen atom.

The above-mentioned process is desirably carried out at or below room temperature. The use of an inert solvent is not indispensable, but is preferable for smooth progress of the reaction. As the dihydrogen halide agent, an organic tertiary base is desirably used, but a carbonate of an alkali metal or alkaline earth metal may also be used.

The second embodiment of the present invention lies in a process for preparing the ester represented by the aforesaid Formula I by reacting, in the presence of a basic condensing agent, an N-halomethylimide represented by the formula,

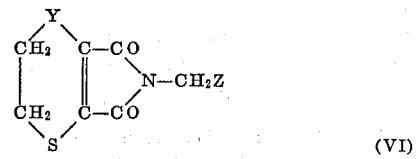

(VI)

wherein Y is as defined above, and Z is a halogen atom, with a cyclopropanecarboxylic acid represented by the formula,

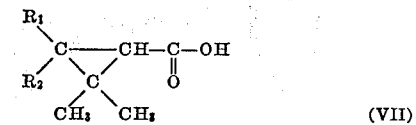

(VII)

wherein $R_1$ and $R_2$ are as defined above.

In practicing the above-mentioned process, the use of a solvent is not indispensable, but the use of an inert solvent is desirable for smooth progress of the reaction. As the basic condensing agent, there is used an organic tertiary base or a hydroxide or carbonate of an alkali metal or alkaline earth metal. When the organic tertiary base is used, the base may have previously been reacted with the N-halomethylimide or the carboxylic acid, but it is advantageous that the three members are simultaneously reacted together. Further, when the inorganic hydroxide or carbonate is used, it is preferable that the hydroxide or carbonate has previously been reacted with the carboxylic acid to form a salt, though it may be, of course, possible, that three members are simultaneously reacted together.

The third embodiment of the present invention lies in a process for preparing the esters represented by the aforesaid Formula I by reacting the N-hydroxymethylimide of the Formula IV with an anhydride of the cyclopropanecarboxylic acid represented by the Formula VII.

In this case, it is effective for shortening the reaction time that the reaction is carried out in an inert solvent under reflux at an elevated temperature, though the reaction progresses even at room temperature.

The fourth embodiment of the present invention lies in a process for preparing the esters represented by the Formula I by reacting the N-hydroxymethylimide of the Formula IV with the cyclopropanecarboxylic acid of the Formula VII in the presence of such a dehydrating agent as dicyclohexylcarbodiimide. In this case, it is preferable for smooth progress of the reaction that the reaction is effected at room temperature and in the presence of an inert solvent.

STARTING MATERIALS

The cyclopropanecarboxylic acid of Formula III used as the reactant according to the present invention can be prepared by already known processes, and, if necessary, may be converted to each of the reactive derivatives according to well known methods.

The N-hydroxy- or halo-methylimide represented by the Formula II is a novel compound.

The N-hydroxymethylimide (IV) can be easily obtained by heating a corresponding imide together with, for example, an aqueous formalin solution.

The thus obtained N-hydroxymethylimide (IV) may be treated with a chlorinating agent to obtain the N-halomethylimide (VI).

The N-hydroxy- or halomethylimides represented by the Formula II which are used in the present invention include N-hydroxy- or halomethyl-3-thia-1-cyclohexene-1,2-dicarboximide and N-hydroxy- or halomethyl-3,6-dithia-1-cyclohexene-1,2-dicarboximide. In the acid components employed in the present invention, there are involved those having asymmetric carbon atoms. Further, optical active compounds represented by the aforesaid Formulas III and V are also involved in the present invention.

INSECTICIDAL COMPOSITION

In the preparation of insecticidal compositions, the new esters of Formula I may be formulated into any desired forms of oil sprays, emulsifiable concentrates, dusts, wettable powders, aerosols, mosquito coils, fumigants, granules, baits and luring dust or solid preparation, according to known methods in the art, using auxiliary agents and/or carriers for common insecticidal compositions. Further, they may be formulated into death-inducing powdery or solid preparations incorporated with baits or other materials capable of attracting such injurious insects.

The insecticidal compositions thus formed may be increased in its activity when used in admixture with a synergist for pyrethroid such as 3,4-methylenedioxy-6-propylbenzylbutyldiethyleneglycol ether (hereinafter referred to as "piperonylbutoxide"), 1,2-methylenedioxy-4[2-(octyl-sulfinyl)-propyl]-benzene (hereinafter referred to as "sulfoxide"), N-(2-ethylhexyl)-bicyclo[2,2,1]hepta-5-ene-2,3-dicarboximide (hereinafter referred to as "MGK-264," registered trade name for said imide produced by McRolin Gormley King Co.), N-(4-pentynyl)-phthalimide or n-propyl-O-propargylphenyl phosphate (hereinafter referred to as NIA-16388). When the present compounds are formulated into mosquito coils, the activity can be increased by incorporation of a known additive therefor, such as 3,4-methylenedioxybenzoic acid, 2,6-di-tert-butyl-4-methylphenol, benzene-p-dicarboxylic acid, benzene-m-dicarboxylic acid, p-tert-butylbenzoic acid, piperonyl-p-tert-butylbenzoate, 1-methyl-2-carboxy-4-isopropylcyclohexanone-3,3-methoxy-4-hydroxybenzoic acid or 2-isopropyl-4-acetylvaleric acid. In addition, the present compounds may be formulated into multi-purpose compositions by incorporating other active ingredients such as pyrethroids, for example, pyrethrum extracts, allethrin, 3,4,5,6-tetrahydrophthalimidomethyl chrysanthemate (hereinafter referred to as "tetramethrin"), 5-benzyl-3-furylmethyl chrysanthemate; organic chloride insecticides, for example, dichlorodiphenyltrichloromethane (referred to as "DDT"), benzene hexachloride (referred to as "BHC") and methoxychlor; organophosphorus insecticides, for example, O,O-dimethyl-O-(3-methyl-4-nitrophenyl) phosphorothioate (hereinafter referred to as "fenitrothion"), O,O-dimethyl-O-(2,2-dichlorovinyl) phosphate (referred to as "DDVP"); carbamate type insecticides, for example, 1-naphthyl-N-methylcarbamate and 3,4-xylyl-N-methylcarbamate; or other insecticides, fungicides, acaricides, herbicides, fertilizers or other agricultural chemicals.

The present invention will be more particularly illustrated by the following examples which should not restrict the invention defined in the attached claims.

Examples 1-7.—Production of the cyclopropanecarboxylic acid esters

EXAMPLE 1

4.0 g. of N-hydroxymethyl-3-thia-1-cyclohexene-1,2-dicarboximide and 2.4 g. of dry pyridine were dissolved in 20 ml. of dry benzene. To this solution was added a solution of 3.7 g. of dl-cis, trans-chrysanthemic acid chloride in 15 ml. of dry benzene. After thorough shaking, the mixed solution was tightly sealed in a vessel and was allowed to stand overnight at room temperature. On the next day, the reaction mixture was washed successively with 5% hydrochloric acid, 5% aqueous sodium carbonate solution and aqueous sodium chloride solution (saturated), was dried over anhydrous magnesium sulfate and was freed by distillation from the solvent, whereby a pale yellow oily substance was obtained. The thus obtained oily substance was purified by flowing through an alumina-packed column to obtain 6.1 g. of N-(dl-cis, trans - chrysanthemoxymethyl) - 3 - thia-1-cyclyohexene-1,2-dicarboximide, $n_D^{27.5}$: 1.5450.

Elementary analysis for $C_{18}H_{23}O_4NS$. Found (percent): C, 61.7; H, 6.5; N, 3.8; S, 9.1. Calculated (percent): C, 61.9; H, 6.6; N, 4.0; S, 9.2.

EXAMPLE 2

4.3 g. of N-hydroxymethyl-3,6-dithia-1-cyclohexene-1,2-dicarboximide and 3.7 g. of dl-trans-chrysanthemic acid chloride were reacted together in the same manner as in Example 1. The reaction mixture was washed successively with 5% hydrochloric acid, 5% aqueous sodium carbonate solution and aqueous sodium chloride solution (saturated), and was then dried over anhydrous magnesium sulfate. Subsequently, the solvent was removed by distillation, and the resulting residue was recrystallized from ligroinbenzene to obtain 5.9 g. of yellow-prism-like crystals of N-(dl-trans-chrysanthemoxymethyl) - 3,6 - dithia - 1 - cyclohexene-1,2-dicarboximide, M.P. 115°–117° C.

Elementary analysis for $C_{17}H_{21}O_4NS_2$. Found (percent): C, 55.7; H, 5.7; N, 3.7%; S, 17.2. Calculated (percent): C, 55.6; H, 5.8; N, 3.8; S, 17.5.

EXAMPLE 3

4.0 g. of N-hydroxymethyl-3-thia-1-cyclohexene-1,2-dicarboximide and 5.4 g. of 2,2,3,3 - tetramethylcyclopropane-1-carboxylic anhydride were dissolved in 50 ml. of toluene, and the solution was heated under reflux for 4 hours. After cooling, the reaction mixture was washed successively with 5% aqueous sodium carbonate solution and aqueous sodium chloride solution (saturated), and was then dried over anhydrous magnesium sulfate. Subsequently, the toluene was removed by distillation, and the resulting residue was purified by flowing through an alumina-packed column to obtain 5.6 g. of a pale yellow viscous oily N-(2',2',3',3' - tetramethyl-cyclopropane-1'-carboxymethyl) - 3-thia-1-cyclohexene-1,2-dicarboximide, $n_D^{26}$: 1.5471.

Elementary analysis for $C_{16}H_{21}O_4NS$. Found (percent): C, 59.2; H, 6.8; N, 4.2; S, 9.7. Calculated (percent): C, 59.4; H, 6.5; N, 4.3; S, 9.9.

EXAMPLE 4

3.5 g. of N-chloromethyl-3,6-dithia-1-cyclohexene-1,2-dicarboximide and 2.6 g. of dl-trans-crysanthemic acid were dissolved in 30 ml. of methylisobutylketone. This solution was added to 3.0 g. of triethylamine and the mixture was heated under reflux for 10 hours.

Thereafter, the reaction mixture was treated in the same manner as in Example 2 to obtain 3.7 g. of crystals of N-(dl-trans-chrysanthemoxymethyl) - 3,6 - dithia-1-cyclohexene-1,2-dicarboximide.

EXAMPLE 5

4.0 g. of N-hydroxymethyl-3-thia-1-cyclohexene-1,2-dicarboximide and 3.0 g. of dl-cis,trans - 2,2,3-trimethyl-cyclopropane-1-carboxylic acid chloride were treated in the same manner as in Example 1 to obtain 5.3 g. of pale yellow oily N-(dl-cis,trans-2',2',3'-trimethylcyclopropane-1' - carboxymethyl) - 3-thia - 1-cyclohexene-1,2-dicarboximide, $n_D^{26}$: 1.5377.

Elementary analysis for $C_{15}H_{19}O_4NS$. Found (percent): C, 58.2; H, 6.4; N, 4.2; S, 10.0. Calculated (percent): C, 58.2; H, 6.2; N, 4.5; S, 10.4.

EXAMPLE 6

3.0 g. of N-hydroxymethyl-3-thia-1-cyclohexene-1,2-dicarboximide and 3.5 g. of dl-trans,trans-pyrethric acid chloride were treated in the same manner as in Example 1 to obtain 5.0 g. of pale yellow oily N-(dl-trans,trans-pyrethroxymethyl) - 3 - thia-1-cyclohexene-1,2-dicarboximide, $n_D^{26}$: 1.5597.

Elementary analysis for $C_{19}H_{23}O_6NS$. Found (percent): C, 58.3; H, 6.1; N, 3.4; S, 7.8. Calculated (percent): C, 58.0; H, 5.9; N, 3.6; S, 8.1.

EXAMPLE 7

4.0 g. of N-hydroxymethyl-3-thia-1-cyclohexene-1,2-dicarboximide and 3.4 g. of dl-cis,trans-chrysanthemic acid were mixed with 30 ml. of methylene dichloride. To this mixture was added 4.4 g. of dicyclohexylcarbodiimide, and the resulting mixture was allowed to stand for 24 hours, whereby dicyclohexylurea was precipitated. After separating the dicyclohexylurea by filtration, the residue was treated in the same manner as in Example 3 to obtain 5.6 g. of N-(dl-cis,trans-chrysanthemoxymethyl)-3-thia-1-cyclohexene-1,2-dicarboximide.

Examples 8–15.—Preparation of insecticidal composition and test data thereof

EXAMPLE 8

0.2 part of each of the present compounds (1), (2), (3), (4) and (5) was dissolved in kerosene to make the total amount 100 parts, whereby a 0.2% oil spray of each compound was obtained.

EXAMPLE 9

A mixture of 0.1 part of the present compound (2) and 0.5 part of butoxide was dissolved in kerosene to make the total amount 100 parts, whereby an oil spray was obtained.

EXAMPLE 10

A mixture of 0.1 part of the present compound (3) and 0.3 part of fenitrothion was dissolved in kerosene to make the total amount 100 parts, whereby an oil spray was obtained.

EXAMPLE 11

20 parts of each of the present compounds (1), (2) and (3) was mixed and stirred with 10 parts of Sorpol SM–200 a mixture of anionic surface active agents such as alkylaryl calcium sulfonate, etc. and nonionic surface active agents such as polyoxyethylene sorbitane alkylate, etc. (registered trade name for an emulsifier produced by Toho Chemical Co., Ltd.), and 70 parts of xylene to obtain a 20% emulsifiable concentrate of each compound.

EXAMPLE 12

0.8 g. of each of the present compounds (3) and (4) was dissolved in 20 ml. of methanol. This solution was uniformly mixed and stirred with 99.2 g. of a mosquito coil carrier (a 3:5:1 mixture of Tabu powder, pyrethrum marc and wood powder). After vaporizing the methanol, the mixture was added with 150 ml. to water and was thoroughly kneaded. The thus kneaded mixture was shaped and dried to obtain a 0.8% mosquito coil of each compound.

EXAMPLE 13

To 5 parts of the present compound (2) were added 5 parts of Toyolignin CT (lignine sulfonate, registered trade name for a product of Toyo Spinning Co., Ltd.) and 90 parts of GSM Clay (siliceous clay, registered trade name for a clay produced by Zieklite Mining Co., Ltd.), and the mixture was thoroughly stirred in a mortar. Subsequently, the mixture was added to water in an amount of 10% based on the weight of the mixture, was further stirred, was granulated by means of a granulator, and was then air-dried to obtain a granular preparation.

EXAMPLE 14

0.3 part of the present compound (1), 0.1 part of tetramethrin, 1.6 parts of butoxide, 6 parts of xylene and 7 parts of deodorized kerosene were mixed and dissolved together. The thus obtained solution was filled in an aerosol container and, after attaching a valve portion to the container, 85 parts of a propellant (liquefied petroleum gas) was charged therein under pressure through said valve portion to obtain an aerosol.

EXAMPLE 15

A solution of 1 part of the present compound (1) in 20 parts of acetone was thoroughly mixed and stirred in a mortar with 99 parts of 300 mesh diatomaceous earth, and then the acetone was removed by vaporization to obtain a dust.

The insecticidal effects of the present compositions obtained in the above manner will be shown below with reference to test examples.

Test Example 1

About 20 housefly adults were liberated in a (70 cm.)³ glass chamber. Into the glass chamber was uniformly sprayed by means of a glass atomizer under a pressure of 20 pounds 0.7 ml. of each of the 0.2% oil sprays of the present compounds (1), (2), (3), (4) and (5) which had been formulated according to Example 8. Thereafter, the number of knocked down houseflies was observed with lapse of time. The results were shown in Table 1.

TABLE 1

| Composition (oil spray) | Knock-down ratio with lapse of time (percent) | | | | |
|---|---|---|---|---|---|
| | 38 seconds | 1 minute 15 seconds | 2 minute 30 seconds | 5 minutes | 10 minutes |
| 0.2% oil spray of compound— | | | | | |
| 1 | 7 | 40 | 84 | 97 | 100 |
| 2 | 1 | 27 | 75 | 96 | 100 |
| 3 | 14 | 63 | 95 | 100 | 100 |
| 4 | 4 | 15 | 55 | 80 | 95 |
| 5 | 10 | 46 | 88 | 98 | 100 |
| 0.2% Allethrin [1] | 4 | 18 | 52 | 78 | 88 |

[1] Control.

Test Example 2

5 ml. of each of the oil sprays obtained according to Examples 9 and 10 was sprayed by use of the Campbel's turn table apparatus [("Soap and Sanitary Chemicals," vol. 14, No. 6, 119 (1938)]. After 20 seconds from the spray, the shutter was opened, and housefly adults (about 100 flies per group) were exposed to the mist for 10 minutes and were then transferred to an observation cage. In the cage, the flies were fed and were allowed to stand for one day at room temperature. Thereafter, the flies killed were observed to calculated the mortality thereof. The results were set forth in Table 2.

TABLE 2

| Composition (oil spray): | Mortality (percent) |
|---|---|
| Oil spray of Example | 85 |
| Oil spray of Example 10 | 100 |
| 0.2% oil spray of allethrin [1] | 82 |

[1] Control.

Test Example 3

Each of the emulsifiable concentrates of the present compounds (1), (2) and (3) which had been obtained according to Example 11 was diluted with water to 50,000 times. 1.5 l. of the thus prepared emulsion was charged into a styrene case of 23 cm. x 30 cm. with a depth of 6 cm. Into the case, about 100 full-grown larvae of northern house mosquitoes were liberated, whereby more than 90% of the larvae could be killed on the next day.

Test Example 4

About 20 adults of northern house mosquitoes were liberated in a (70 cm.)³ glass chamber. Subsequently, 1 g. of each of the mosquito coils of the present compounds (3) and (4) which had been obtained according to Example 12 was ignited on the both ends and was placed at the center in the chamber. Thereafter, the knock-down effect of each mosquito coil on the mosquito adults was observed with lapse of time. As the result, more than 90% of the mosquito adults could be knocked down within 20 minutes.

Test Example 5

10 l. of water was poured into a 14 l. polyethylene bucket. Into the water was charged 1 g. of the 5% granular preparation of the present compound (2) which had been obtained according to Example 13. One day after, about 100 full-grown larvae of northern house mosquitoes were liberated in the water, and the alive and dead thereof were observed, whereby more than 90% of the larvae could be killed within a period of 24 hours.

Test Example 6

Rice plants, which had elapsed 45 days after sowing, were grown in a 1/50,000 Wagner pot. The 20% emulsifiable concentrate of the present compound (1) among those obtained according to Example 11 was diluted with water to 200 times and was sprayed onto the rice plants in a proportion of 10 ml. per pot, and the pot was covered with wire net. Into the pot were then liberated about 30 adults of green rice leafhoppers, whereby more than 90% of the leafhoppers could be killed after one day.

Test Example 7

The insecticidal effects of the aerosol obtained according to Example 14 on housefly adults were tested by the aerosol test method using Peet Grady's chamber [the method disclosed in "Soap and Chemical Specialities, Blue Book," (1965)]. The results were shown in Table 3.

TABLE 3

| Composition (aerosol) | Sprayed amount (g./1,000 ft.³) | Knock-down ratio | | | Mortality (percent) |
|---|---|---|---|---|---|
| | | 5 minutes | 10 minutes | 15 minutes | |
| Aerosol of Example 7 | 3.1 | 21 | 67 | 89 | 59 |
| Aerosol [1] containing— 0.4% pyrethrin 2.0% DDT | 3.0 | 19 | 55 | 76 | 42 |

[1] Control.

Test Example 8

A glass Petri dish of 14 cm. in inner diameter and 7 cm. in height was coated on the inner wall with butter, leaving at the lower part an uncoated portion of about 1 cm. in width. Onto the bottom of the dish, the dust of the present compound (1) which had been obtained according to Example 15 was uniformly dusted in a proportion of 2 g./m.². Subsequently, 10 German cockroach adults were liberated in the dish and were contacted with the dust for 30 minutes, whereby more than 90% of the cockroaches were knocked down after one day and could be killed after 3 days.

What is claimed is:

1. A carboxylic acid ester having the formula, $$\begin{array}{c} Y \\ CH_2 \\ | \\ CH_2 \\ S \end{array} \begin{array}{c} C-CO \\ \diagdown \\ \diagup \\ C-CO \end{array} N-CH_2-O-C-CH-C \begin{array}{c} R_1 \\ \diagdown \\ R_2 \\ CH_3 \\ CH_3 \end{array}$$

wherein $R_1$ is hydrogen atom or methyl, $R_2$ is methyl, 2-methyl-1-propenyl or 2-methoxycarbonyl-1-propenyl when $R_1$ is hydrogen atom, and $R_2$ is methyl when $R_1$ is methyl, and Y is methylene group or sulfur atom.

2. A compound according to claim 1, wherein $R_1$ is hydrogen and $R_2$ is 2-methyl-1-propenyl.

3. A compound according to claim 1, wherein $R_1$ and $R_2$ are respectively methyl.

4. A compound according to claim 1, wherein $R_1$ is hydrogen and $R_2$ is 2-methoxycarbonyl-1-propenyl.

5. A compound according to claim 1, wherein $R_1$ is hydrogen and $R_2$ is methyl.

6. A compound of the formula, $$\begin{array}{c} CH_2 \\ CH_2 \\ | \\ CH_2 \\ S \end{array} \begin{array}{c} C-CO \\ \diagdown \\ \diagup \\ C-CO \end{array} N-CH_2-O-C-CH-CH-CH=C \begin{array}{c} CH_3 \\ \diagdown \\ CH_3 \\ CH_3 \\ CH_3 \end{array}$$

7. A compound of the formula, $$\begin{array}{c} S \\ CH_2 \\ | \\ CH_2 \\ S \end{array} \begin{array}{c} C-CO \\ \diagdown \\ \diagup \\ C-CO \end{array} N-CH_2-O-C-CH-CH-CH=C \begin{array}{c} CH_3 \\ \diagdown \\ CH_3 \\ CH_3 \\ CH_3 \end{array}$$

8. A compound of the formula, $$\begin{array}{c} CH_2 \\ CH_2 \\ | \\ CH_2 \\ S \end{array} \begin{array}{c} C-CO \\ \diagdown \\ \diagup \\ C-CO \end{array} N-CH_2-O-C-CH-C \begin{array}{c} CH_3 \\ \diagdown \\ CH_3 \\ CH_3 \\ CH_3 \end{array}$$

9. A compound of the formula, $$\begin{array}{c} CH_2 \\ CH_2 \\ | \\ CH_2 \\ S \end{array} \begin{array}{c} C-CO \\ \diagdown \\ \diagup \\ C-CO \end{array} N-CH_2-O-C-CH-CH-CH_3 \begin{array}{c} \\ C \\ CH_3 \\ CH_3 \end{array}$$

10. A compound of the formula, $$\begin{array}{c} CH_2 \\ CH_2 \\ | \\ CH_2 \\ S \end{array} \begin{array}{c} C-CO \\ \diagdown \\ \diagup \\ C-CO \end{array} N-CH_2-O-C-CH-CH-CH=C \begin{array}{c} CH_3 \\ \diagdown \\ COOCH_3 \\ CH_3 \\ CH_3 \end{array}$$

(References on following page)

References Cited

UNITED STATES PATENTS

| | | | |
|---|---|---|---|
| 3,266,984 | 8/1966 | Ueda et al. | 167—33 |
| 3,268,396 | 8/1966 | Kuramoto et al. | 167—33 |
| 3,268,398 | 8/1966 | Kato et al. | 167—33 |
| 3,268,400 | 8/1966 | Kato et al. | 167—33 |
| 3,316,275 | 4/1967 | Kato et al. | 260—326 |
| 3,318,766 | 5/1967 | Kato et al. | 167—33 |
| 3,377,356 | 4/1968 | Ueda et al. | 260—326.3 |
| 3,440,245 | 4/1969 | Kato et al. | 260—281 |

ALEX MAZEL, Primary Examiner

J. TOVAR, Assistant Examiner

U.S. Cl. X.R.

424—274